Aug. 19, 1952 M. A. TOWNSEND 2,607,902
GASEOUS DISCHARGE DEVICE
Filed Nov. 21, 1950 4 Sheets-Sheet 1
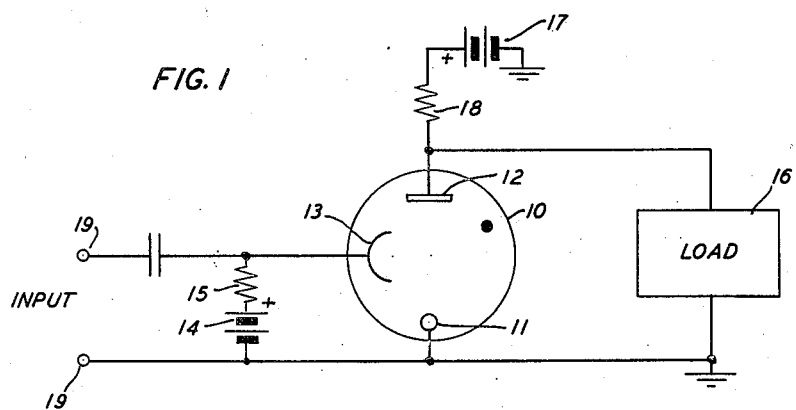
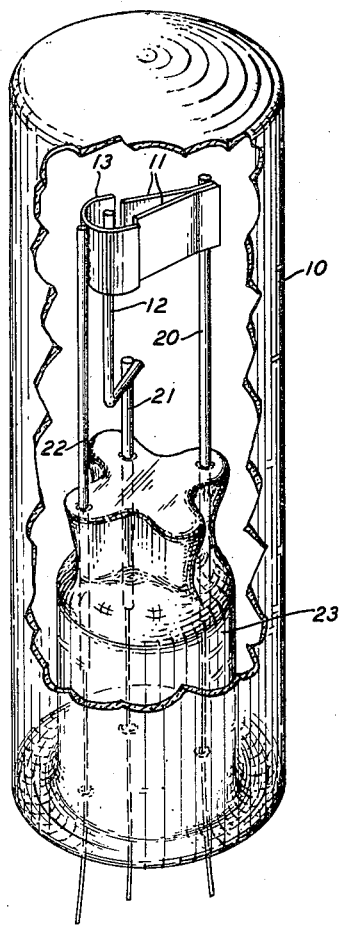
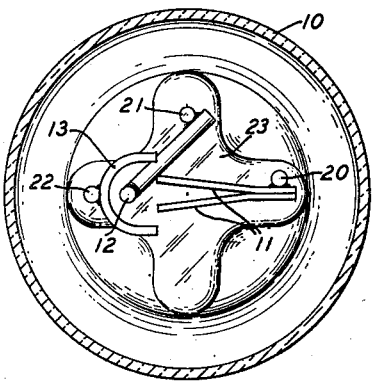
INVENTOR
M. A. TOWNSEND
BY
ATTORNEY Aug. 19, 1952 M. A. TOWNSEND 2,607,902
GASEOUS DISCHARGE DEVICE
Filed Nov. 21, 1950 4 Sheets-Sheet 3

INVENTOR
M. A. TOWNSEND
BY
ATTORNEY

Aug. 19, 1952 M. A. TOWNSEND 2,607,902
GASEOUS DISCHARGE DEVICE
Filed Nov. 21, 1950 4 Sheets-Sheet 4

INVENTOR
M. A. TOWNSEND
BY
ATTORNEY

Patented Aug. 19, 1952

2,607,902

UNITED STATES PATENT OFFICE 2,607,902

GASEOUS DISCHARGE DEVICE

Mark A. Townsend, Berkeley Heights, N. J., assignor to Bell Telephone Laboratories, Incorporated, New York, N. Y., a corporation of New York Application November 21, 1950, Serial No. 196,782

15 Claims. (Cl. 313—188)

This invention relates to gaseous discharge devices and more particularly to such devices particularly suitable for use as amplifiers.

A number of types of gaseous discharge amplifiers have been proposed heretofore but these have suffered from practical limitations such as complexity of structure or circuitry, relatively low efficiency, restriction to undesirably low gas pressures and difficulty or irregularity of control of the output current.

One general object of this invention is to improve the construction and performance of gaseous discharge amplifiers.

More specifically, objects of this invention are to simplify the structure of gaseous discharge devices particularly suitable for use as amplifiers, increase the efficiency of such devices, obtain uniform amplification over a wide band of operating frequencies, and enhance the stability of gaseous discharge amplifiers.

In one illustrative embodiment of this invention, a discharge device comprises an enclosing vessel having therein an ionizable atmosphere, for example a rare gas, and housing an anode and a cathode. The cathode may be of either the glow or thermionic type.

In accordance and with feature of this invention, an auxiliary or control electrode is provided in such relation to the anode that the voltage and effective impedance of the cathode-anode gap are controllable by the potential of the auxiliary or control electrode.

More specifically, in accordance with one feature of the invention, the anode and cathode are constructed and arranged so that an anode voltage drop obtains and the auxiliary or control electrode is mounted in immediate proximity to the anode whereby its potential is effective to control the anode voltage drop.

Two modes of operation to realize this control are possible. In one the control or auxiliary electrode is biased at or near cathode potential and the output is in phase with the input signal. In the other, and preferred, mode, the auxiliary or control electrode is biased at of the order of the floating potential, that is the potential this electrode would assume with no connection made to it. For this mode, the output signal is substantially 180 degrees out of phase with the input signal.

In one specific embodiment of this invention, the auxiliary or control electrode partly encompasses a linear or rod anode and is operated at a potential positive with respect to the cathode and of the order of 70 per cent of the sustaining voltage of the anode-cathode gap.

The invention and the above noted and other features there of will be understood more clearly and fully from the following detailed description with reference to the accompanying drawing in which:

Fig. 1 is a circuit diagram showing the principal components of an amplifier constructed in accordance with this invention;

Fig. 2 is a perspective view of a gaseous discharge device illustrative of one embodiment of this invention;

Fig. 3 is a top view of the electrodes in the device shown in Fig. 2;

Figure 7:
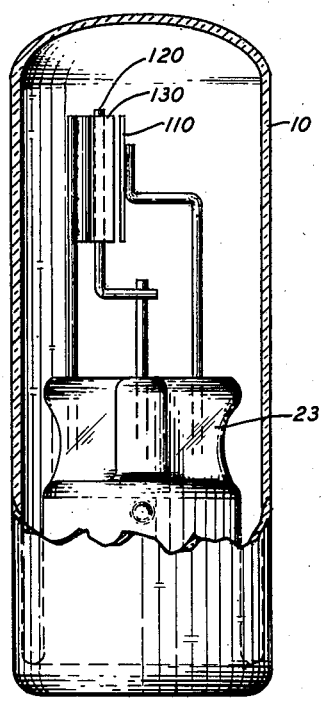
Figs. 7 and 8 are elevational and plan views respectively of a discharge device illustrative of another embodiment of this invention.
Figure 8:
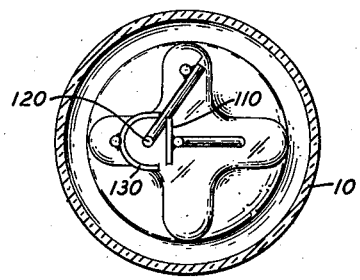
Figure 9:
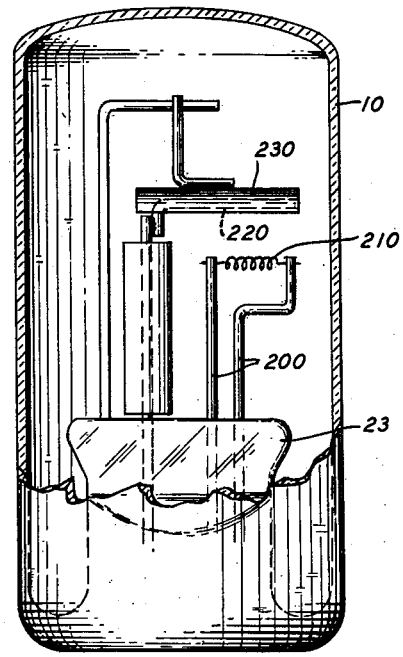
Figs. 9 and 10 are elevational views taken at right angles to each other of a discharge device illustrative of still another embodiment of this invention.
Figure 10:
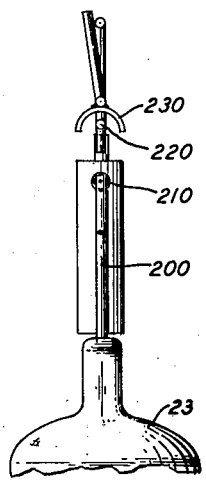
Figure 11:
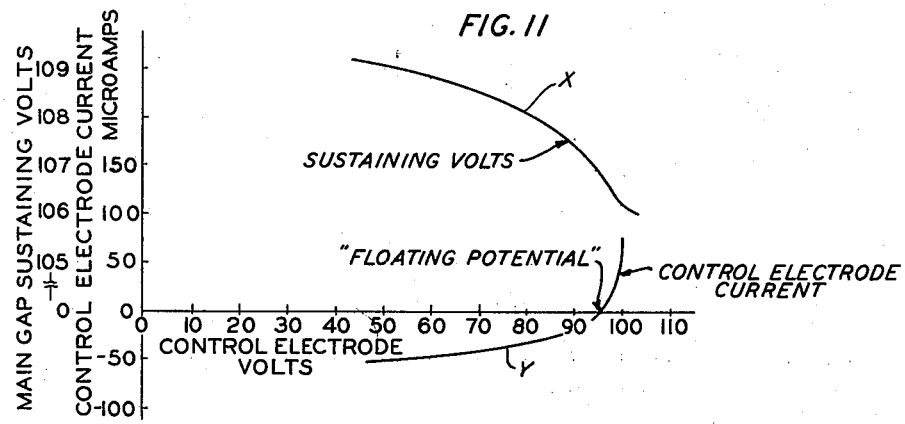
Figure 12:
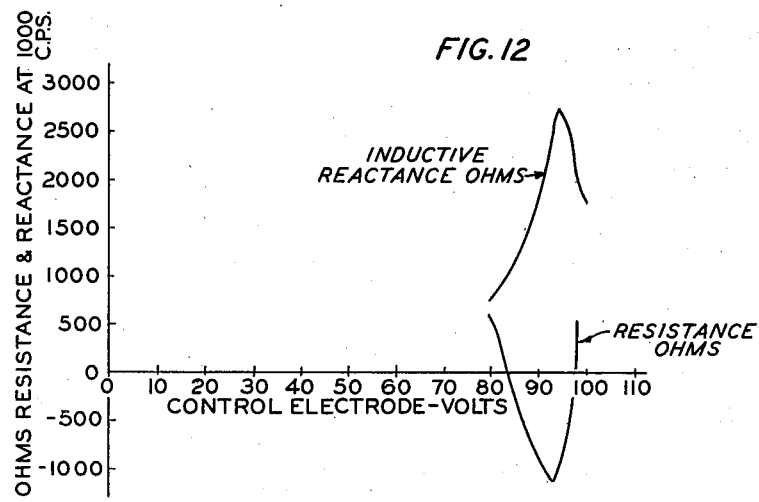
Figure 13:
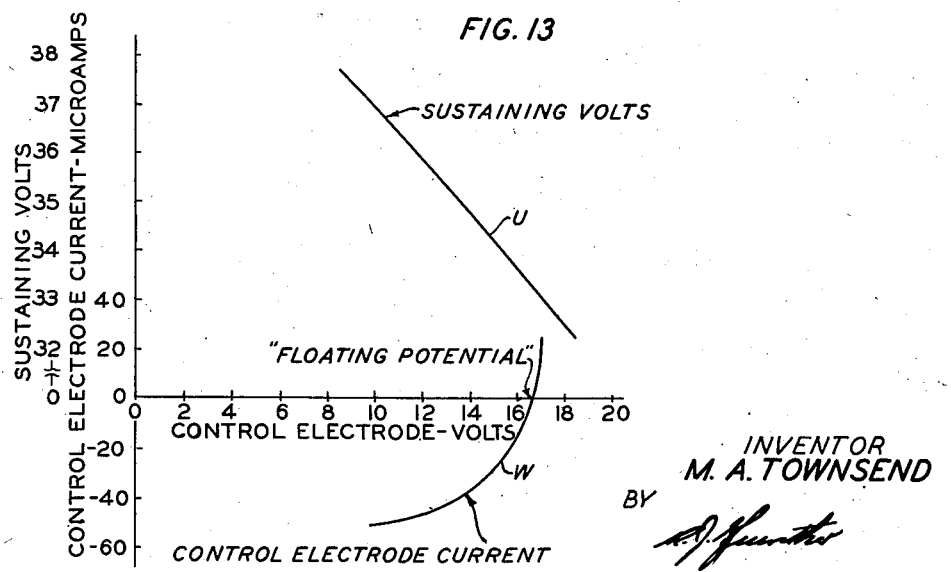

Figs. 11 and 12 are graphs depicting typical operating characteristics for devices of the construction illustrated in Figs. 7 and 8; and Fig. 13 is a graph showing typical operating characteristics for devices of the construction illustrated in Figs. 9 and 10.

Referring now to the drawing, the discharge device illustrated in Fig. 1 comprises a gas filled enclosing vessel 10 having therein a cathode 11, an anode 12 and a control or auxiliary electrode 13. An input circuit including a biasing source 14 and resistor 15 is connected between the cathode and control electrode, and a utilization circuit including the load 16 is connected between the cathode and anode. The anode is biased relative to the cathode by a source 17 in series with a resistor 18. As will be discussed in some detail presently, input signals impressed between the terminals 19 result in variations in the power supplied to the load 16. The nature of these variations and the mechanisms accountable therefor will be appreciated from the following considerations:

When a discharge exists across the anode 12-cathode 11 gap, the voltage across the gap is composed essentially of two components. One component is associated with the region in immediate proximity to the cathode and is termed the cathode drop. It is dependent upon the cathode geometry and material, the kind and pressure of the gas filling and the current. This component is independent, for practical purposes, of the size and position of the anode.

The other component is associated with the region in the immediate vicinity of the anode and is termed the anode voltage drop. It is dependent primarily upon the size and position of the anode. In general, reducing the anode area or increasing the anode-cathode gap causes the anode voltage drop to increase toward a value approximating the ionizing potential of the gaps.

Figure 4:
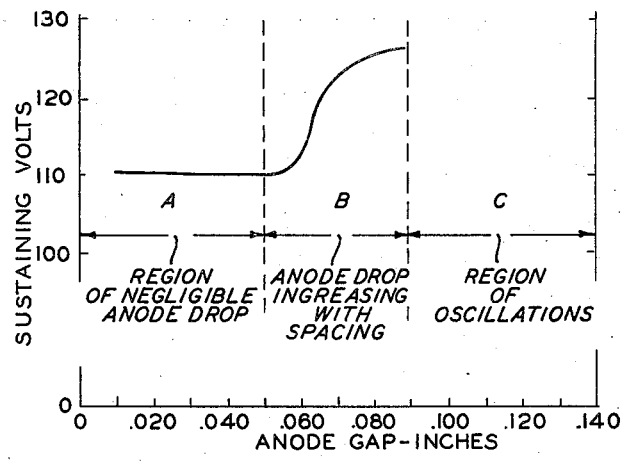
Figs. 4 and 5 are graphs illustrating certain principles involved in the operation of gaseous discharge devices constructed in accordance with this invention.

These relationships are depicted on Fig. 4 which presents the sustaining voltage as a function of gap length, for a constant operating current, for a typical glow discharge diode. As is evident from this figure, over a range of anode-cathode gaps up to about 0.050 inch, the sustaining voltage is substantially constant; the anode drop is negligible. For a range of larger gaps, however, the sustaining voltage increases with gap length. This increase is attributable to the increasing anode drop. For still greater gap lengths, specifically beyond about 0.090 inch, the discharge becomes unstable and oscillations may set in.

Figure 5:
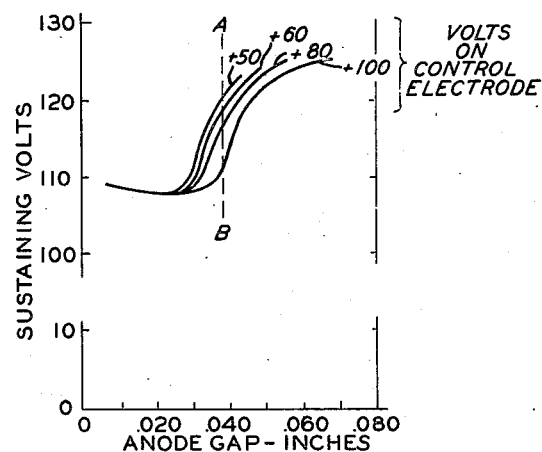

It has been found that the anode drop can be varied controllably, specifically by an auxiliary or control electrode in proximity to the anode. This is portrayed in Fig. 5, which is a sustaining voltage versus gap length graph similar to Fig. 3 and for a device of the same construction as that having the characteristics shown in Fig. 3 except that it included an auxiliary strip form electrode adjacent the anode. The third variable, indicated on the individual curves in Fig. 5, is the voltage on the auxiliary or control electrode. For these curves, the operating current was maintained constant.

It will be noted from Fig. 5 that for a given gap the sustaining voltage across the gap varies with the voltage of the control or auxiliary electrode. For example, for a gap of about 0.038 inch, the sustaining voltage increases from about 110 to 120 volts for a decrease in the potential of the control electrode from 100 to 50 volts, as indicated by the ordinates along line AB. As will be brought out presently, the current drawn by the control electrode is extremely small in comparison to the anode current, for example microamperes in comparison to milliamperes, so that power amplification is obtained.

The control of the sustaining voltage and, hence, in effect of the anode gap impedance, in the manner described above is consistent with and explicable by the following analysis: The anode drop is attributable to a deficiency of ionization of the gas filling for the device in the immediate vicinity of the anode whereby an electron sheath is established at or around the anode. The greater the thickness of this sheath, the larger is the drop across it. When the anode is of large area or close to the cathode, as for the region A in Fig. 4, the sheath is at most of very small thickness so that the anode drop is negligible. For a very small area anode or large anode-cathode spacing, as for the region C in Fig. 4, the anode drop is high and electrons injected into or through the sheath may result in ionization which in turn may cause collapse of the sheath and the establishment of oscillations.

For the conditions corresponding to region B in Fig. 4, the sheath aforementioned is controllable in thickness by a potential effective in the immediate vicinity thereof. Specifically, when the auxiliary or control electrode is made negative with respect to the region adjacent the anode, positive ions are drawn away from this space whereby the electron sheath is increased and, consequently, the anode drop is increased. Thus, the effect of the control electrode upon the anode drop is a function of the control electrode potential.

As has been indicated hereinabove, the establishment of an anode drop of appreciable amplitude requires at least a minimum anode to cathode spacing. Other factors upon which the anode drop and its establishment are dependent are the gas, the pressure thereof, the electrode geometry and the operating current. The precise relationships of parameters requisite to the production of an anode drop which is controllable to vary the sustaining voltage in the manner set forth hereinbefore are not determinable by mathematical analyses. However, certain factors are established and the character of parametral relationships will be clear from the hereinafter described specific embodiments of this invention whereby the novel results achieved by this invention can be realized with a variety of specifically different devices.

In general, for any cathode geometry, the region corresponding to A in Fig. 4 wherein the anode drop is negligible increases in extent as the gas pressure is decreased or as the anode area is increased. The region A may also be decreased by the presence of any deionizing surface near the anode such as the tube envelope or an electrode surface operating at a potential below that of the space nearby.

The embodiment of this invention illustrated in Figs. 2 and 3 comprises a refractory metal cold cathode 11 having a V-shaped channel therein, a linear wire refractory metal anode 12 opposite the open side of the channel in the cathode and a refractory metal auxiliary or control electrode 13, which is of U or substantially semicylindrical shape and substantially coaxial with the anode 12 as seen most clearly in Fig. 3. The cathode, anode and control electrode are mounted in the desired space relation by rigid leading-in conductors 20, 21 and 22 respectively, sealed into the stem 23 of the vessel 10.

In a specific structure, the cathode was formed of 0.010 inch molybdenum sheets ⅛ inch high, the open side of the channel in the cathode was 0.025 inch wide, the anode was of 0.012 inch diameter molybdenum spaced substantially 0.050 inch from the channel in the cathode and the control electrode was of 0.010 inch sheet molybdenum having an internal diameter of substantially $\tfrac{3}{16}$ inch. The gas filling in the vessel 10 was neon at a pressure of 48 millimeters of mercury.

Figure 6:
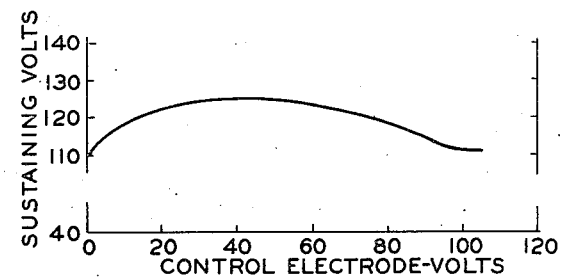
Fig. 6 is a graph illustrating the performance of devices of the construction shown in Figs. 2 and 3.

The amplification characteristic of the specific device described in the preceding paragraph hereof is illustrated in Fig. 6 which portrays the sustaining voltage of the anode gap as a function of the potential of the control electrode 13 at an operating current of 5.4 milliamperes. As is apparent from Fig. 6, for the control electrode operated at about 100 volts or higher the sustaining voltage is substantially 110 volts. However, as the control electrode is made less positive the sustaining voltage increases to a maximum of substantially 125 volts at a control electrode voltage of 40 volts. Over the range of control electrode potentials from 40 to 100 volts it will be noted that the sustaining voltage varies regularly with control electrode voltage; thus, with the device connected in a circuit such as illustrated in Fig. 1 the potential across the load would vary in like manner for an input signal impressed between the terminals 19.

Typical operating parameters for the specific device above described included in a circuit of the configuration illustrated in Fig. 1 are: anode bias 118 volts, control electrode bias 80 volts, resistor 15, 800,000 ohms, and resistor 16, 10,000 ohms. For a load or output current of 5.4 milliamperes, the current to the control electrode is −40 microamperes. The power gain for small input signals, e. g. of the order of 2 volts root mean square, is about 12 decibels over the audio frequency range, specifically, starting from a maximum of 12 decibels at 300 cycles and dropping to 9 decibels at 5,000 cycles. The input impedance of the device is 0.65 megohm and the resistive component of the output impedance is negative and of the order of 5,000 ohms decreasing somewhat with frequency, e. g. from −4100 ohms at 300 cycles to −2200 ohms at 3,000 cycles. The reactive component of the output impedance is inductive and about 0.25 henry.

In another specific embodiment of this invention illustrated in Figs. 7 and 8, the cathode 110 is a flat refractory metal plate for example of molybdenum ⅛ inch wide by ¼ inch long by 0.010 inch thick mounted opposite the open side of the U-shaped or semicylindrical control or auxiliary electrode 130 and having an inner diameter of about ⅞ inch. The anode 120 is a linear rod or wire mounted substantially coaxially with the control electrode 130, spaced approximately .080 inch from the cathode, and the filling for the envelope 10 was argon at a pressure of 15 millimeters of mercury.

Typical performance characteristics for the above described device illustrated in Figs. 7 and 8 are portrayed in Figs. 11 and 12. In Fig. 11 curve X shows the sustaining voltage as a function of the voltage upon the control electrode, and as will be noted is of the same general form as the curve presented in Fig. 6 and described heretofore. Curve Y in Fig. 11 shows the relation between the control electrode current and the control electrode voltage, the floating potential, namely the point at which the control electrode current is zero, being indicated.

Fig. 12 depicts the relation between the resistive and reactive components of the output impedance of the device as a function of the potential of the auxiliary or control electrode. It will be noted that the reactance is inductive and reaches a maximum at a control electrode voltage of about the floating potential. It will be noted also that the resistive component is positive for control electrode potentials below about 84 volts and above about 97 volts and is negative for potentials between these two values also reaching a maximum at about the floating potential.

For the curves presented in Figs. 11 and 12 the main gap current was maintained fixed at 1.9 milliamperes.

In still another specific embodiment of this invention illustrated in Figs. 9 and 10, the cathode 210 is in the form of a helix having thereon a coating of thermionic material and supported between leading-in conductors 200 by way of which current for heating the cathode may be supplied. The cathode is mounted opposite a linear molybdenum anode 220 which is positioned substantially at the axis of the U-shaped or substantially semicylindrical control electrode 230. The cathode may be spaced from the anode a distance of 0.010 inch and the control electrode may be of 0.020 inch thick "Kovar" alloy, having an inner diameter of 0.025 inch. The vessel 10 may have therein a filling of neon at a pressure of 50 millimeters of mercury.

Typical performance characteristics for a device of the construction illustrated in Figs. 9 and 10 and described above are presented in Fig. 13. In this figure, the curves are for an operating main gap current of 34 milliamperes and curve U depicts the relationship between the control electrode potential and the sustaining voltage. Curve W presents the relation between control electrode current and potential of this electrode, the floating potential point being indicated. The general similarity between the curves of Fig. 13 and those of Fig. 11 is apparent.

For all of the specific devices described and in general as has been pointed out hereinbefore, advantageously the devices are operated with the auxiliary or control electrode biased at about the floating potential.

Although specific embodiments of this invention have been shown and described it will be understood that they are but illustrative and that various modifications may be made therein without departing from the scope and spirit of this invention.

What is claimed is:

1. A gaseous discharge device comprising an enclosing vessel having an ionizable atmosphere therein, a cathode and an anode within said vessel, means for establishing a discharge between said anode and cathode such that an anode voltage drop obtains, and means for varying said voltage drop comprising an auxiliary electrode adjacent the discharge gap between said anode and cathode.

2. A gaseous discharge device in accordance with claim 1 wherein said cathode is of the cold, glow type.

3. A gaseous discharge device in accordance with claim 1 wherein said cathode is of the heated type.

4. A gaseous discharge device comprising an enclosing vessel having an ionizable atmosphere therein, a cathode and an anode within said vessel, means for establishing a discharge of preassigned current between said anode and cathode, said cathode and anode being spaced such that at said current a substantial anode voltage drop obtains, and means for varying said anode voltage drop comprising a control electrode adjacent said anode.

5. A gaseous discharge device comprising an enclosing vessel having an ionizable atmosphere therein, a cathode and an anode within said vessel, means for establishing an electron sheath adjacent said anode comprising means for establishing a direct-current flow between said cathode and anode sufficient to produce a substantial anode voltage drop, a control electrode in proximity to said anode, an output circuit connected between said cathode and anode, and input circuit means connected between said cathode and control electrode including source means for biasing said control electrode positive with respect to said cathode at a potential of the order of the floating potential for said control electrode.

6. A gaseous discharge amplifier comprising an enclosing vessel having an ionizable atmosphere therein, a cathode and an anode within said vessel, a control electrode in proximity to said anode, means biasing said anode with respect to said cathode at a potential to sustain a discharge between said cathode and anode, and means biasing said control electrode at a potential substantially equal to the floating potential thereof.

7. A gaseous discharge device comprising an enclosing vessel having an ionizable atmosphere therein, a cold cathode having a channel shaped portion, an anode opposite the open side of said portion and spaced from said cathode a distance such that with a potential between said anode and cathode sufficient to sustain a discharge therebetween a substantial anode drop obtains, and a control electrode adjacent said anode.

8. A gaseous discharge device in accordance with claim 7 wherein said anode is of rod form and extends substantially parallel to said portion, and wherein said control electrode is substantially semicylindrical and partly encompasses said anode.

9. A gaseous discharge device comprising an enclosing vessel having an ionizable atmosphere therein, a substantially semicylindrical control electrode within said vessel, a linear rod anode extending substantially along the axis of said control electrode, and a cathode opposite the open side of said control electrode, the anode to cathode spacing being such that at a potential between said cathode and anode to sustain a discharge therebetween a substantial anode drop obtains.

10. A gaseous discharge device in accordance with claim 9 wherein said cathode is of the cold type and has therein a substantially V-shaped channel the open side of which is opposite and extends substantially parallel to said anode.

11. A gaseous discharge device in accordance with claim 9 wherein said cathode is of the heated type and comprises a filament substantially parallel to said anode.

12. A gaseous discharge device comprising an enclosing vessel having therein a filling of neon at a pressure of about 48 millimeters of mercury, a cold cathode and an anode within said vessel and spaced a distance between about 0.060 inch and 0.090 inch, and a control electrode in proximity to said anode.

13. A gaseous discharge device comprising an enclosing vessel having a filling of neon therein, a cold cathode and an anode within said vessel and spaced a distance about 0.070 inch, a control electrode adjacent said anode, means biasing said anode at about 120 volts positive relative to said cathode, and means biasing said control electrode at about 80 volts positive relative to said cathode.

14. A gaseous discharge device comprising an enclosing vessel having a filling of argon at a pressure about 15 millimeters of mercury, a cold cathode and anode within said vessel and spaced a distance of about 0.080 inch, a control electrode adjacent said anode, means biasing said anode at about 107 volts positive relative to said cathode, and means biasing said control electrode at about 95 volts positive relative to said cathode.

15. A gaseous discharge device comprising an enclosing vessel having therein a filling of neon at a pressure of about 48 millimeters of mercury, an incandescible cathode and an anode within said vessel and spaced a distance of about 0.010 inch, a control electrode adjacent said anode, means biasing said anode at about 35 volts positive with respect to said cathode, and means biasing said control electrode at about 16 volts positive relative to said cathode.

MARK A. TOWNSEND.

No references cited.